Jan. 18, 1966   J. J. YAGELOWICH   3,230,501
SCANNED OUTPUT LINE TRANSDUCER
Filed Oct. 31, 1962   3 Sheets-Sheet 1
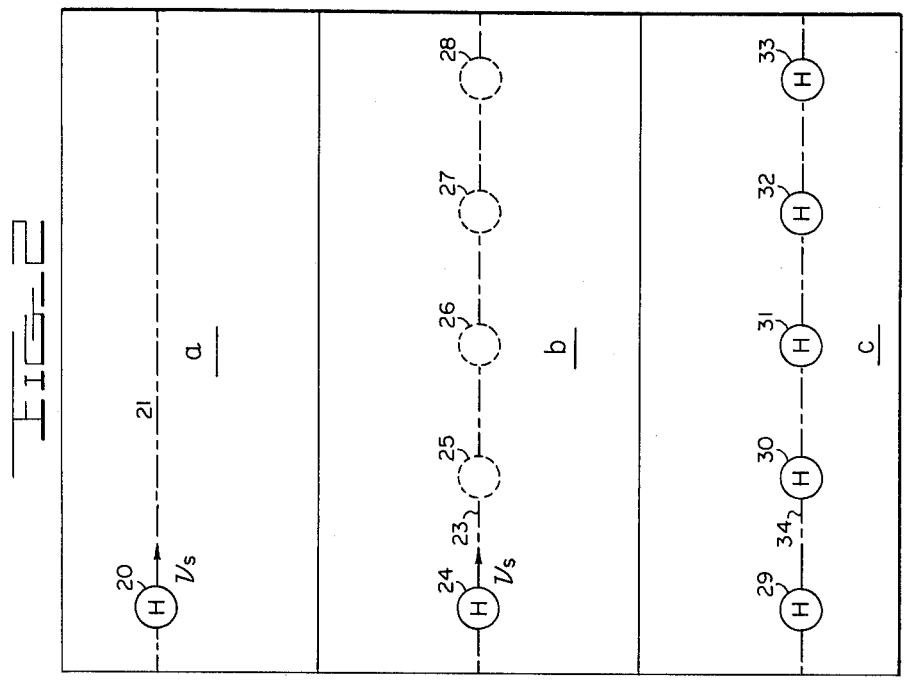
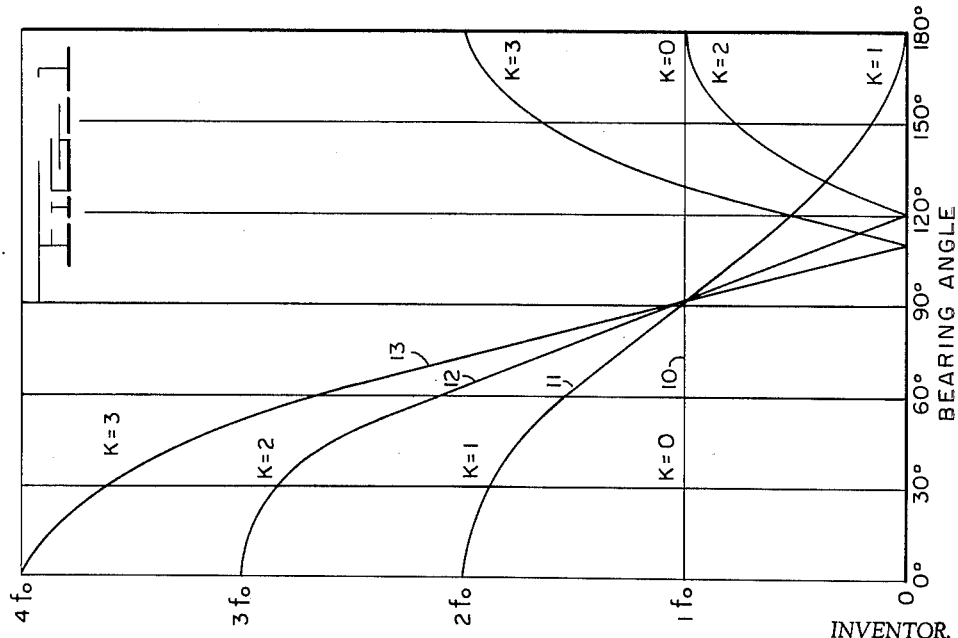
INVENTOR.
JOHN J. YAGELOWICH
BY *John E. Hufford, agent*
*Richard C. Reed*
ATTORNEY Jan. 18, 1966   J. J. YAGELOWICH   3,230,501
SCANNED OUTPUT LINE TRANSDUCER
Filed Oct. 31, 1962   3 Sheets-Sheet 2
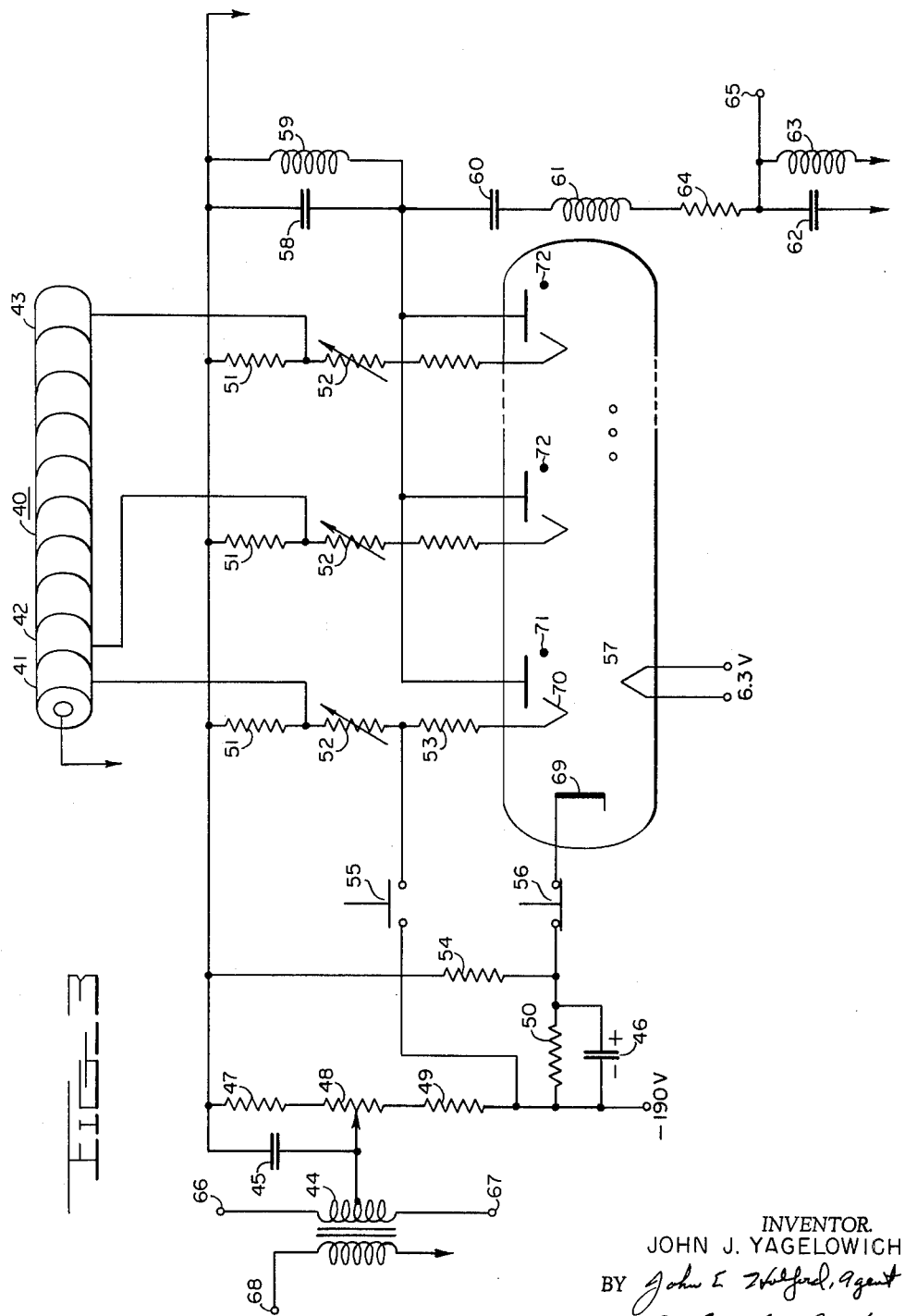
INVENTOR.
JOHN J. YAGELOWICH
BY John L. Whitford, Agent
ATTORNEY Jan. 18, 1966  J. J. YAGELOWICH  3,230,501
SCANNED OUTPUT LINE TRANSDUCER
Filed Oct. 31, 1962  3 Sheets-Sheet 3
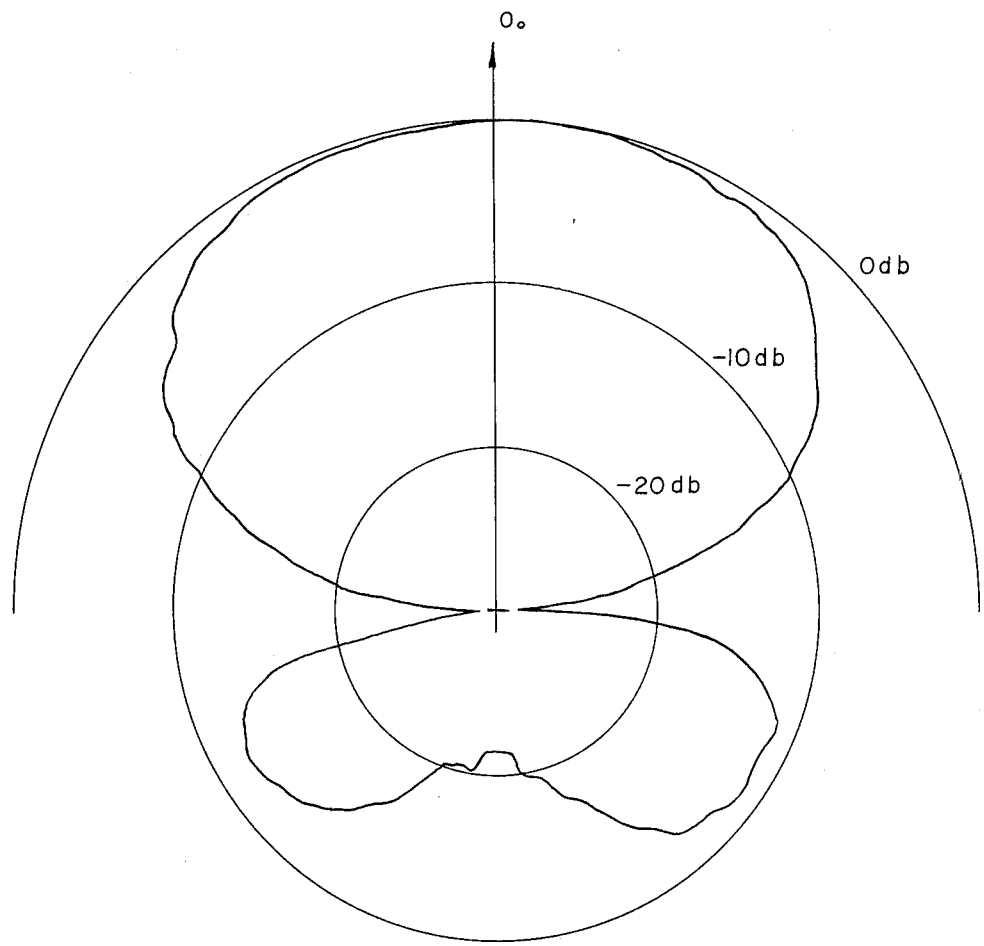
INVENTOR.
JOHN J. YAGELOWICH
BY John E. Hulford, Agent
Richard C. Reed
ATTORNEY United States Patent Office 3,230,501
Patented Jan. 18, 1966

3,230,501
SCANNED OUTPUT LINE TRANSDUCER
John J. Yagelowich, Greenbelt, Md., assignor to the United States of America as represented by the Secretary of the Navy
Filed Oct. 31, 1962, Ser. No. 234,913
5 Claims. (Cl. 340—6)
(Granted under Title 35, U.S. Code (1952), sec. 266)

The invention described herein may be manufactured and used by or for the Government of the United States of America for governmental purposes without the payment of any royalties thereon or therefor.

The present invention relates to a receiver for use in an active pulse-echo sonar system. More particularly it relates to a receiver in which a hydrophone is effectively placed in motion relative to the sound waves being detected.

The use of long range pulse echo sonar systems has presented a number of problems. Unlike radio waves, with which they are often compared, these waves do not follow straight paths through their propagating medium, but instead bend with changes of temperature and salinity of the medium. As a result an echo received from a target often arrives with echoes from slightly nearer or more distant points where discontinuities in the medium are encountered. These latter echoes are termed "reverberation" or "background signal."

One method of reducing reverberation is to employ a very narrow beam array of sound transducers. Unfortunately long range sonars use low frequency sources which are difficult to beam. In general the beamwidth of the array is inversely proportional to its dimensions in wavelengths, while the size and mass of the individual transducers tend to vary directly with wavelength. As the operating frequency is lowered the size of the array must, therefore, be reduced in most practical applications.

A second method of reducing reverberation is to take advantage of the Doppler shift, when present, in the target echo. This can be done by passing the signals through a frequency discriminating device such as a filter to enhance the desired signal. For the more difficult targets, i.e., slow moving ones, this places close limitations on the filter design. In a borderline case, a slight error in resonant frequency will reverse the operation of the filter so that it enhances the reverberation signal instead of that from the target.

An object of the present invention is, therefore, to provide a pulse-echo sonar receiver for use with an array of transducers which provides a more narrow beam width than is normally attained with that array at a given frequency of operation.

A further object of the invention is to provide a sonar receiver which enhances the Doppler effect in the echo from a moving target so that it can be more easily filtered out of the background signal.

A more specific object of the invention is to provide a circuit which produces an apparent motion of a transducer array which is greater than any actual motion that might be imparted thereto.

These and other objects or attendant advantages of the present invention will be best understood with reference to the following specification taken in conjunction with the accompanying drawings wherein:

FIG. 1 is a graphic representation of the Doppler frequencies received by four transducers, one stationary and three in uniform motion, as a function of the incident angle of reception;

FIG. 2 shows a diagram of three methods of producing effective uniform motion of a sonar hydrophone;

FIG. 3 shows a typical embodiment of the invention using an array of crystal hydrophones and a beam switching electron tube; and FIG. 4 shows the beam pattern obtained from the system of FIG. 3.

The invention utilizes a sonic phenomenon known as Dopper which is itself old and well understood. In general Doppler effects are caused by relative motion between a source and receiver which alters their spacing, or by motion of a reflector which forms a part of the path between two such elements to achieve the same effect. The latter effect has been used extensively in pulse-echo sonars to identify and track targets. The former effect is particularly useful in passive systems with stationary receivers wherein only the motion of the target is involved and a greater amount of information is received per unit time.

The present invention involves the use of the latter effect with pulse echo equipment. More specifically the purpose of the invention is to induce a Doppler effect by moving the hydrophone of a sonar system with respect to the target. A simple analysis shows that this expedient enhances the Doppler shift of a target with respect to the shift in the background or reverberation signal.

*Analysis.*—A sonar source, having zero velocity, transmits a frequency, $f_0$. The signal returned by the background is also $f_0$. At the output of the hydrophone, having an apparent velocity $v_s$, the frequency of the background signal is $$B_s = f_0\left(1 + \frac{v_s}{c}\right)$$

where $v_s$ = velocity of hydrophone
$c$ = sound velocity

With $v_s$ directed toward the target, the frequency of the target signal out of the hydrophone is $$T_s = f_0\left(1 + \frac{v}{c}\right)^2\left(1 + \frac{v_s}{c}\right)$$

where $v$ is the target velocity along the $v_s$ vector. Subtracting these two expressions $$T_s - B_s = f_0\left(\frac{2v}{c} + \frac{2vv_s}{c^2}\right), \text{ if } v \ll c$$

and by letting $v_s = kc$ $$T_s - B_s = \frac{2vf_0}{c}(1 + k)$$

The term $$\frac{2v}{c}f_0$$

is the normal value for Doppler shift. For positive values of $k$ this normal Doppler shift is enhanced by the factor $1 + k$.

In general $v_s$ and $v$ will not be in the same direction and in that case $$T_s - B_s = \frac{2v}{c}f_0(1 + k \cos \theta)$$

where $\theta$ is the angle between the $v_s$ and $v$ vectors.

The curves in FIG. 1 will serve to show how the Doppler enhancement is utilized in beam formation. The line 10 for $k=0$ represents a stationary transducer, and as would be expected it receives the same transmitted frequency $f_0$ from all directions from relatively stationary targets. The remaining curves 11–13 represent transducers moving at constant velocity. All such transducers receive the transmitted frequency from targets at right angles to the direction of movement, higher frequencies from targets in the direction of motion and lower or higher frequencies, depending on the value of $k$, from targets in the opposite direction. The portions of the curves representing velocities greater than the velocity of sound are special functions of a Doppler simulating system to be described.

FIG. 2 shows diagrammatically three systems of imparting effective continuous motion to a transducer. The transducer 20 may, for example, be moved constantly along a line 21, as shown in FIG. 2A. FIG. 2B shows another system employing a transducer 24 which moves along a line 23 in steps, pausing at positions 25–28 where the received signal is sampled at regular time intervals. When combined these signals resemble closely that received by the transducer 20 in FIG. 2A. The resemblance increases with the number of sampling positions used per unit of time. Finally FIG. 2C shows a system wherein separate transducers 29–33 are placed at points along a line 34 corresponding to the positions 24–28 in FIG. 2B. When these transducers are scanned at a uniform rate the result is the same as that obtained in the system of FIG. 2B. The system of FIG. 2C has the advantage that it can be made without moving parts.

FIG. 3 shows one embodiment of the invention using an electron beam switching tube. The switching tube used was a Burroughs 6700 having ten sequential gated tetrodes. The electrical circuitry for this tube is fashioned from readily available components as listed in the following table.

| No. | Element | Type | Value |
|---|---|---|---|
| 44 | Transformer | UTC LS 12 X | |
| 45 | Capacitor | Tubular | .02 mfd. |
| 46 | do | Electrolytic | 16 mfd./150 v. |
| 47 | Resistor | Carbon | 33K ohm. |
| 48 | Potentiometer | do | 25K ohm. |
| 49 | Resistor | do | 33K ohm. |
| 50 | do | do | 5.6K ohm. |
| 51 | do | do | 1.5K ohm. |
| 52 | do | do | 50K ohm. |
| 53 | do | do | 120K ohm. |
| 54 | do | do | 100K ohm. |
| 55 | Push Button Switch | Normally open | |
| 56 | do | Normally closed | |

The switching tube is powered in a conventional fashion. A source of 6.3 volts is connected to the cathode heater 57. The cathode 69 is connected through switch 56 to a source of −190 volts. The plates are connected in parallel to ground through a parallel resonant circuit consisting of capacitor 58 and inductor 59.

Sonar signals are introduced by connecting successive sections such as 41, 42, 43 of a transducer to successive signal grids 70 of the switching tube. Amplifiers (not shown) may be used to boost the output from each section before it is applied to the switching tube. Elements 58 and 59 are selected to resonate at the sonar frequency plus the desired Doppler shift introduced by the switching tube. For this reason the values of these elements are not given, and these elements probably should be variable. The same is true of the series resonant coupling elements 60 and 61 or the parallel resonant output elements 62 and 63. The value of isolation resistor 64 depends on the load impedance to be connected at the output 65.

The transducer may be composed of any type of hydrophones. A convenient form is a series of short hollow cylindrical crystals with electrodes plated on their curved surfaces. Either the inner or outer electrodes may be connected together and to ground with the remaining electrodes connected to the switching tube. Analysis indicates that satisfactory operation is obtained with an array that is $16k$ wavelengths long, where $k$ is the ratio of the scan velocity to the speed of sound in the surrounding medium, as has previously been indicated. The number of hydrophones indicated by a similar analysis is $32(1+k)$.

To operate the system one end 66 of the output winding of transformer 44 is connected to every other of the control grids 71 of the switching tube and the other end 67 to the remaining control grids 72. Input pulses applied to the input 68 will then enable each tetrode in the switching tube to sequence. The output amplitude of each tetrode is equalized by the potentiometer 52. To start a series of scans switch 55 must be closed. To begin a new series of scans the switching tube should be cleared by opening switch 56, which has been provided for this purpose.

FIG. 4 shows the beam pattern for stationary targets obtained with a ten section underwater transducer array one wavelength long operating with signals having a frequency of 3 kilocycles in water. The transducer was scanned repetitively at 2929 c.p.s. and the resulting signal filtered at a center frequency of 5929 c.p.s. with a bandwidth of 167 c.p.s. Referring to FIG. 1 the theoretical beam angle can be determined by placing the appropriate bandwidth coordinate below $2f_0$ and noting its intersection with the curve of $k=1$.

The fact that the experimental results do not agree exactly with the theoretical can be attributed both to mechanical imperfections in the hastily assembled transducer and the fact that the criterion for transducer length and number of sections, as set forth earlier, have not been met.

In order to obtain the best results a switching tube with sixteen tetrodes or a pair of ten tetrode tubes may be used. Repetitive scanning was used to obtain more data on the beamwidth, but in practice single scans must be used to secure the desirable Doppler enhancement mentioner earlier.

Obviously many modifications and variations of the present invention are possible in the light of the above teachings. It is therefore to be understood that within the scope of the appended claims the invention may be practiced otherwise than as specifically described.

What is claimed is:

1. A sonar receiver having an operating frequency and comprising, at least three sound transducers disposed in a sound propagating medium and mounted on a common axis, switching means to sequentially scan the outputs of said transducers along said axis, and the distance between the most remote of said transducers being equal to at least a plurality times the wavelength of said operating frequency times the ratio of the velocity at which said outputs are scanned to the speed of sound in said medium.

2. A sonar receiver according to claim 1 wherein said transducers are equally spaced and said switching means scans said outputs at a constant rate.

3. A sonar receiver according to claim 1 wherein said switching means scans said transducers at the same rate that sound propagates between said transducers.

4. A sonar receiver according to claim 1 wherein said transducer outputs are tuned to said operating frequency.

5. A sonar receiver according to claim 4 wherein the said distance between the most remote of said transducers is equal to at least 16 times the wavelength of said operating frequency times the ratio of the scan rate divided by the velocity of sound in the medium between said transducers.

References Cited by the Examiner
UNITED STATES PATENTS

| | | | |
|---|---|---|---|
| 2,411,518 | 11/1946 | Busignies | 343—113.2 |
| 2,767,386 | 10/1956 | Ross | 340—6 |
| 3,102,505 | 9/1963 | Dickieson | 340—6 X |
| 3,113,286 | 12/1963 | Miller et al. | 340—6 |

OTHER REFERENCES

Scanned Line Hydrophone Method of Determining Angle of Arrival of Sound in Water: by M. T. Pigott et al., The Journal of the Acoustical Society of America, vol. 34, No. 3, March 1962 (pages 319–328 relied on).

CHESTER L. JUSTUS, *Primary Examiner.*

R. A. FARLEY, *Assistant Examiner.*